Patented Aug. 29, 1950

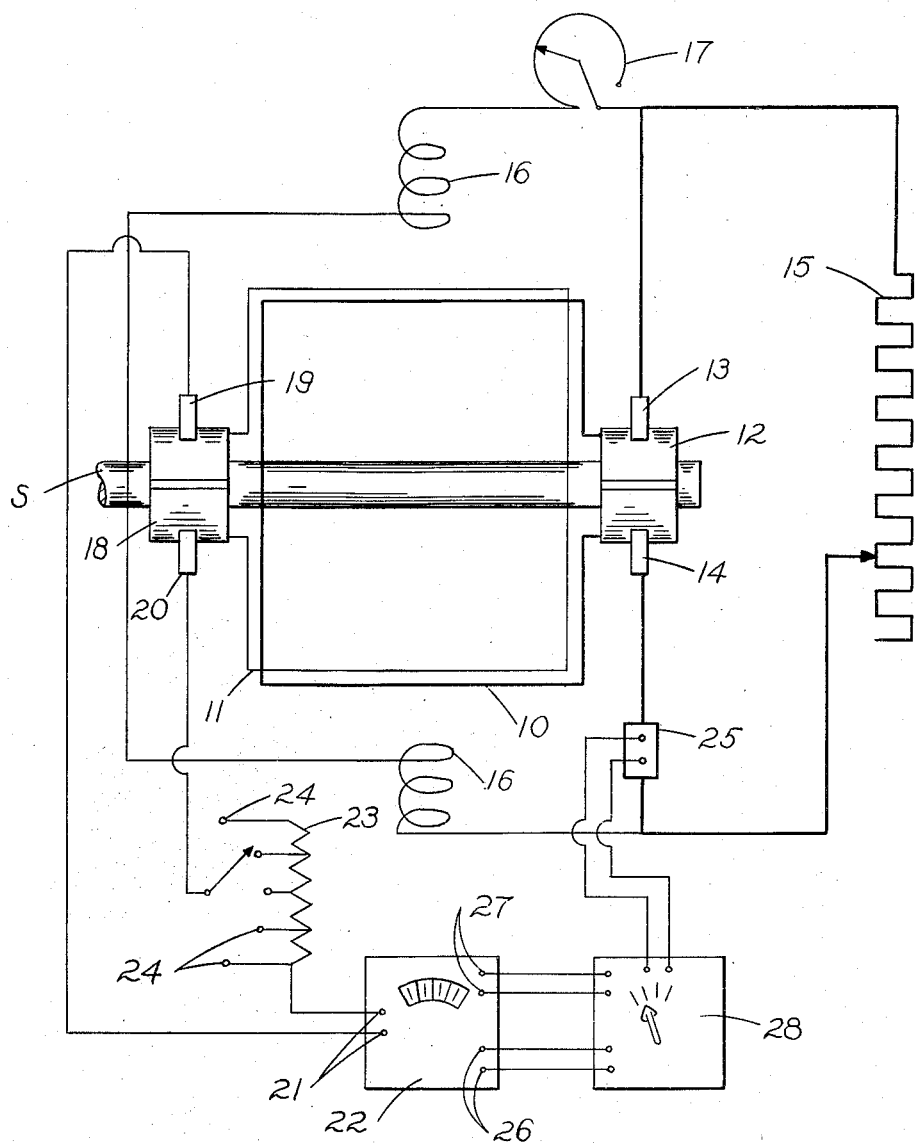

2,520,696

UNITED STATES PATENT OFFICE 2,520,696

DYNAMOMETER

Erasmus D. Smith, Shaker Heights, Ohio, assignor to The Electric Products Company, Cleveland, Ohio, a corporation of Ohio Application March 13, 1946, Serial No. 654,044

5 Claims. (Cl. 73—134)

This invention relates to dynamometers of the type wherein a dynamo-electric machine is used as a generator to measure the power output of another machine, motor or the like. Ordinarily, such an electric dynamometer comprises a generator connected to a resistor to absorb the power output, and provided with a tachometer for measuring the speed of the machine and mounted in a cradle or trunnions with an arm extending to a scale so that the torque of the machine can be measured. From the torque and speed, the power can be calculated.

The present invention has for its principal object the provision of an electric dynamometer in which the necessity for mounting the generator in trunnions is eliminated and in which the power can be determined by direct reading instruments, it being necessary only to make corrections for the losses in the no-load operation of the machine. Another object is the provision of a dynamometer of such a character which can be manufactured at relatively low cost and which is sturdy and substantially foolproof in operation.

Further objects and advantages of the invention will become apparent from the following description of a preferred form thereof, reference being made to the accompanying drawings in which the single figure diagrammatically illustrates a dynamometer made according to my invention.

Briefly, my invention depends upon the known facts that the torque of a dynamo-electric machine is proportional to the armature current and the strength of the air gap field, while the armature voltage is proportional to the speed of rotation of the armature and the strength of the field. These well known relationships may be expressed as follows, letting $T$=torque, $Ia$=armature current, $Va$=armature voltage, $\phi$=magnetic field strength, $S$=rotational speed of the armature, and $K$=a constant:

(1) $$T = KIa\phi$$

or (2) $$Ia = \frac{T}{K\phi}$$

(3) $$S = \frac{Va}{K\phi}$$

or (4) $$Va = K\phi S$$

Thus armature voltage and armature current can be used as a measure of power as shown by the following equation:

(5) $$\text{Power} = TS = KIa\phi \times \frac{Va}{K\phi} = VaIa$$

It is not practical directly to measure the value of the armature voltage of a dynamometer and use this voltage as a measure of speed because of the effect of armature resistance, variations in field strength and other factors. However, according to the present invention, I employ, in addition to the main armature windings, an auxiliary or pilot winding, preferably wound in the same armature slots as the main armature windings, and in which a voltage is generated which is proportional to the internal generated voltage of the main armature winding; the voltage generated in this auxiliary winding is made to actuate the voltage coil of a wattmeter. The current coil of the wattmeter is connected to the main armature circuit, either directly or through a shunt, thus measuring the main armature current. As the voltage generated by the auxiliary winding is directly proportional to speed and flux, and the main armature current is directly proportional to torque and inversely proportional to flux, the wattmeter can be properly calibrated to read directly in horsepower. Inasmuch as the auxiliary winding is on the same armature as the main winding, the constant $K$ for this winding will be the same as the constant $K$ for the main winding, this constant depending upon the general design of the machine. From Equation 5 above, it will be seen that variations in field strength cannot affect the accuracy of the readings. Substantially no current flows in the auxiliary winding, so that the $I^2R$ losses therein are inconsequential. Thus the wattmeter readings give an accurate indication of power except for stray power losses such as friction, windage, hysteresis and eddy current losses. These can be readily determined by operating the machine as a motor at no-load and taking no-load readings of the wattmeter at various speeds.

The drawing diagrammatically illustrates a dynamometer embodying my invention and adapted to measure the power applied to its shaft S. The shaft S carries an armature which may be of any conventional construction and which is provided with a main armature winding 10 and an auxiliary or pilot winding 11. The main winding is connected to the commutator 12 and by means of brushes 13 and 14 to conductors leading to the load resistor 15. The generator is also provided with shunt field coils 16 energized from the main armature circuit, the strength of the shunt field being controlled by the shunt field resistor 17. Except for the auxiliary winding 11, the apparatus just described may be a conventional shunt generator, preferably of the commutating pole type designed for a wide range of operating speeds.

The auxiliary winding 11, which is preferably wound in the same slots as the main winding 10, is connected to another commutator 18, and the output of the pilot winding is carried by brushes 19 and 20 and suitable conductors to the voltage terminals 21 of the wattmeter 22. By this means, a voltage is impressed on the wattmeter which, as shown by Equation 4 above, is proportional to the speed of rotation of the armature and the field strength. Preferably the connections to the voltage terminals 21 of the wattmeter 22 are made through a resistor 23 having a plurality of taps 24. By this means resistance can be cut into or out of the voltage circuit, and thus the instrument can be made to accommodate various speed ranges with the desired degree of accuracy.

In order to obtain a measure of the torque absorbed by the machine, the current coils of the wattmeter 22 are connected, preferably through a shunt 25, into the armature circuit, inside of the connections to the shunt field as shown, so that a current directly proportional to the armature current is applied to the wattmeter. Preferably the wattmeter 22 is provided with two current coils of different values, and the connection to the terminals 26 and 27 of the coils is made through a switch 28, the arrangement being such that either coil may be connected independently of the other, or the two coils may be connected in series or in parallel. Thus with a single shunt the instrument can accommodate a wide range of loads with the desired degree of accuracy. As shown by Equation 2 above, armature current is proportional to torque and inversely proportional to field strength. Thus, as shown by Equation 5 above, the field strength factor cancels out, the voltage and current applied to the wattmeter are directly proportional to speed and torque and hence constitute a true measure of power. The wattmeter is preferably calibrated to read directly in horsepower, to eliminate the need for any calculations.

As noted above, it is necessary to correct the readings to allow for the stray power losses of the machine. This is accomplished by connecting a suitable power supply to the main conductors in place of the resistor 15 and operating the machine as a motor under no-load. The speed of operation is controlled by the field resistor 17 and a series of no-load readings of the wattmeter are obtained at different speeds. From this data a calibration curve can be prepared for correcting the wattmeter readings. After the dynamometer has been properly calibrated, the power output of an engine, for example, may be determined by connecting the engine to the shaft S, operating it at various speeds and loads and reading the power directly from the wattmeter.

From the foregoing description of a preferred form of my invention, it will be seen that I have provided a simple and efficient dynamometer which can be calibrated to give direct readings in horsepower, requiring only correction for no-load or tare readings. Inasmuch as the auxiliary armature winding voltage is proportional to the internal generated voltage of the armature, changes in internal resistance or magnetic field strength do not affect the accuracy of the readings. As the current flowing through the auxiliary winding is only that required to actuate the voltage coil of the wattmeter, the $I^2R$ losses in the auxiliary winding and the auxiliary commutator and brushes are negligible; thus the voltage applied to the wattmeter is directly proportional to armature speed and magnetic field strength. The current applied to the wattmeter is directly proportional to the torque and inversely proportional to the magnetic field strength. Accordingly, the wattmeter gives readings directly proportional to power without requiring any correction for varying operating conditions or for losses other than the stray power losses which can be determined readily by no-load readings. Thus I have provided a simple and accurate dynamometer from which power readings can be obtained directly. Because of the elimination of the trunnion mounting, torque arm and scale heretofore required in dynamometers, my dynamometers can be produced at reasonable cost. The elimination of the torque arm and scale removes a frequent source of trouble in dynamometer operation and makes my dynamometer operable by comparatively unskilled personnel because of its simplicity and because the horsepower can be read directly.

Various changes and modifications may be made in my invention without departing from the spirit and scope thereof. Therefore, it is to be understood that my invention is not limited to the preferred forms described herein or in any manner other than by the scope of the appended claims.

I claim:

1. A dynamometer comprising a generator having a shunt field, an armature having a main winding connected to a load, and an auxiliary winding, the voltage of which is proportional to the internal generated voltage of the main armature winding, and means responsive to the current in said main armature winding and the voltage generated in said auxiliary winding for indicating the power absorbed by said generator.

2. A dynamometer according to claim 1 wherein the power indicating means is a wattmeter.

3. A dynamometer comprising a generator machine having a field, an armature having a main winding disposed in slots and an auxiliary winding disposed in the same slots as the main winding, a main commutator and brushes associated therewith connected to said main winding, an auxiliary commutator and brushes associated therewith connected to said auxiliary winding, and means responsive to the current in said main armature winding and the voltage generated in said auxiliary winding for indicating the power applied to said generator.

4. A dynamometer comprising a generator having a shunt field, an armature having a main winding connected to a load, and an auxiliary winding the voltage of which is proportional to the internal generated voltage of the main armature winding, and a wattmeter having its current coil connected to be responsive to current in said main armature winding and its voltage coil connected to said auxiliary winding, whereby said wattmeter indicates the power absorbed by said generator.

5. A dynamometer comprising a generator having a shunt field, an armature having a main winding disposed in slots and an auxiliary winding disposed in the same slots as the main winding, a main commutator and brushes associated therewith connected to said main winding and to a load resistor, an auxiliary commutator and brushes associated therewith connected to said auxiliary winding, and a wattmeter having its current coil connected to be responsive to current in said main armature winding and its voltage coil connected to said auxiliary winding, whereby said wattmeter indicates the power absorbed by said generator.

ERASMUS D. SMITH.

REFERENCES CITED

The following references are of record in the file of this patent:

UNITED STATES PATENTS

| Number | Name | Date |
|---|---|---|
| 1,807,530 | Highfield | May 26, 1931 |
| 1,958,650 | Walton | May 15, 1934 |